(12) United States Patent
Arellano Echeverria

(10) Patent No.: US 10,317,259 B2
(45) Date of Patent: Jun. 11, 2019

(54) GAUGE UTILIZING LIGHT LEAKAGE TO ILLUMINATE THE SCALE OF A DIAL AND INSTRUMENT PANEL WITH THE GAUGE

(71) Applicant: CONTINENTAL AUTOMOTIVE SYSTEMS INC., Auburn Hills, MI (US)

(72) Inventor: Victoria Elvira Arellano Echeverria, Tlaquepaque (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 5 days.

(21) Appl. No.: 14/501,362

(22) Filed: Sep. 30, 2014

(65) Prior Publication Data

US 2016/0091348 A1    Mar. 31, 2016

(51) Int. Cl.
*F21V 21/00* (2006.01)
*G01D 13/22* (2006.01)
*G01D 11/28* (2006.01)

(52) U.S. Cl.
CPC ............. *G01D 13/22* (2013.01); *G01D 11/28* (2013.01)

(58) Field of Classification Search
CPC ................................ G01D 13/02; G01D 13/22
USPC ................................ 362/23.01, 23.14, 23.21
See application file for complete search history.

(56) References Cited

U.S. PATENT DOCUMENTS

| 7,357,095 | B1 | 4/2008 | Fong et al. |
| 7,798,026 | B2 | 9/2010 | Takato et al. |
| 7,928,859 | B1 | 4/2011 | Li et al. |
| 8,935,989 | B2 * | 1/2015 | Cook ..................... G01D 11/28 |
| | | | 116/286 |
| 2012/0247385 | A1 | 10/2012 | Cook | |

FOREIGN PATENT DOCUMENTS

| CN | 1337908 A | 2/2002 |
| CN | 1383483 A | 12/2002 |
| CN | 2847231 Y | 12/2006 |
| JP | 2010025837 A | 2/2010 |

OTHER PUBLICATIONS

Office Action dated Apr. 25, 2017 for corresponding CN Patent Application No. 201510635540.1.

* cited by examiner

*Primary Examiner* — Laura K Tso

(57) ABSTRACT

A gauge may be constructed in an instrument panel and includes a dial, a motor, and at least one light source for providing backlighting behind the rear side of the dial. The motor is located behind the rear side of the dial. A pointer cap is located in front of the front side of the dial and is connected to the shaft of the motor via the aperture of the dial such that there is a gap between the dial and the pointer cap. The pointer cap has a body portion completely covering the aperture. The pointer cap includes a light blocking element constructed to optically form a pointer by blocking the backlighting from the light source.

1 Claim, 3 Drawing Sheets

GAUGE UTILIZING LIGHT LEAKAGE TO ILLUMINATE THE SCALE OF A DIAL AND INSTRUMENT PANEL WITH THE GAUGE

BACKGROUND OF THE INVENTION

Field of the Invention

The invention relates to a mechanical gauge having a dial with a scale, backlighting for illuminating the scale, and a moveable pointer pointing to the scale on the dial. The invention also relates to an instrument panel including at least one such gauge.

Description of the Related Art

A mechanical gauge includes a dial with a scale and a pointer that is moveable to point to a particular location on the scale of the dial. The dial is constructed with an aperture so that the pointer can be connected to the shaft of a motor that will move the pointer to point to a particular location on the scale of the dial. One problem with this type of gauge is that when there is a large gap between the pointer and the dial, the backlighting that illuminates the scale of the dial leaks or passes through the aperture of the dial and emerges at the front of the dial to undesirably create a halo effect around the pointer.

A known approach used to solve the problem involves using a very detailed pointer design which includes a black cap to avoid light leakage, a pointer constructed as translucent arm with a colored foil, and a prism that transmits the light from a light emitting diode to the translucent arm serving as the pointer.

BRIEF SUMMARY OF THE INVENTION

It is an object of the invention to provide at least one embodiment of a mechanical gauge in which it is desirable to have leaking backlighting that passes through an aperture, which is formed in the dial, and that passes to the front of the dial in the region of the pointer.

It is another object of the invention to use the leaking backlighting to indicate a particular value on the scale on the gauge.

It is a further object of the invention to provide an embodiment in which the leaking backlighting is utilized to optically create a pointer. In this embodiment, it is desirable for the backlighting to leak to the front of the dial at all portions near the scale except for the location at which the pointer will be optically created. In particular, the pointer is optically created by a moving a moveable light blocking element to block out the leaking backlighting at a particular location near the scale at the front of the dial. Since the leaking backlighting appears near the scale of the dial except for the location at which it is blocked, a pointer is optically created by the missing backlighting at the location at which the leaking backlighting blocked. A motor is used to move the moveable light blocking element to a desired or particular location near the scale such that the optically created pointer points to or indicates the desired value on the scale of the dial.

It is another added object of the invention to provide an embodiment in which the leaking backlighting is utilized to enable a physically provided pointer to be seen. In this embodiment, the backlighting is encouraged to leak to the front of the dial at all portions near the scale except for the location at which a physical pointer is provided. The pointer is moved to block out the leaking backlighting near a desired portion of the scale of the dial and the area with no backlighting clearly points to the desired location on the scale. A motor is used to move the pointer to point to or indicate the desired value on the scale of the dial.

It is an additional object of the invention to increase the amount of leaking backlighting that reaches the front of the dial from and/or near the aperture, which is used to connect a pointer cap in front of the dial to the shaft of the motor behind the dial.

Compared to the known solutions, the inventive gauge presents a simpler pointer design since no prism is needed to transmit the backlight, no translucent arm is needed to receive the light from the prism, and only one cap is needed to provide the pointer. The inventive gauge uses less parts to create a pointer compared to the prior art thereby reducing the cost of the pointer. New styling options can also be used.

With the foregoing and other objects in view there is provided, in accordance with the invention, a gauge, including: a dial with a front side, a rear side, a scale, and an aperture formed therein; a motor located behind the rear side of the dial, the motor having a shaft; at least one light source for providing backlighting behind the rear side of the dial; and an opaque pointer cap located in front of the front side of the dial and connected to the shaft of the motor via the aperture of the dial such that there is a gap between the dial and the pointer cap. The pointer cap has a body portion completely covering the aperture. The pointer cap includes a light blocking element constructed to optically form a pointer by blocking the backlighting from the light source.

In accordance with an added feature of the invention, the light blocking element is an opaque pointer extending towards the scale or an opaque projection extending towards the dial.

In accordance with an additional feature of the invention, the dial includes a transparent portion located between the aperture and the scale to allow the backlighting from the light source to pass therethrough; and the body portion of the pointer cap completely covers the transparent portion of the dial.

In accordance with another feature of the invention, the light blocking element is constructed to optically form the pointer by blocking light from the backlighting from the light source that has passed through the transparent portion of the dial and by blocking the backlighting from the light source that has passed through the aperture.

In accordance with a further feature of the invention, the pointer cap includes a side portion extending from the body portion towards the dial; the gap is between the front the of the dial and the side portion of the pointer cap, and the light blocking element extends from an edge of the side portion of the pointer cap towards the dial.

In accordance with a further added feature of the invention, a reflector is located behind the rear side of the dial and positioned for reflecting the backlighting from the light source towards the dial to backlight the dial.

In accordance with a further additional feature of the invention, a housing secures the dial, the motor, and the light source therein.

With the foregoing and other objects in view there is provided, in accordance with the invention, an instrument panel including a front panel and at least one gauge. The gauge is constructed in accordance with the inventive gauge described herein.

Other features which are considered as characteristic for the invention are set forth in the appended claims.

Although the invention is illustrated and described herein as embodied in a gauge utilizing light leakage to illuminate the scale of a dial and instrument panel with the gage, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS OF THE INVENTION

Figure 1:
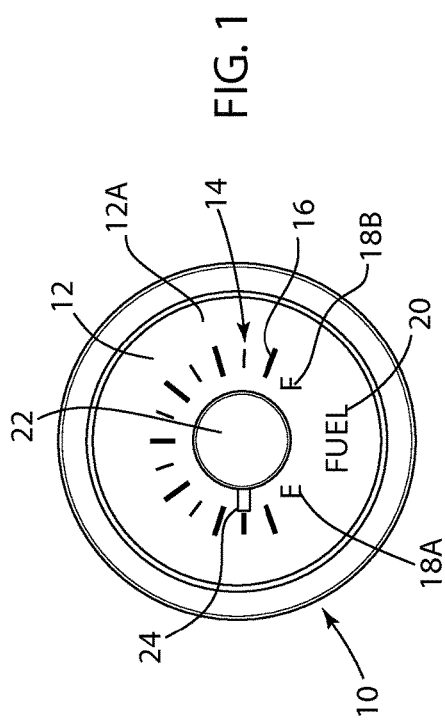
FIG. 1 is a front view of a first exemplary embodiment of a mechanical gauge.

Referring now to the figures of the drawing in detail and first, particularly to FIG. 1 thereof, there is shown a front view of a first exemplary embodiment of a mechanical gauge 10. The gauge 10 includes a dial 12 with a front surface or front side 12A and an opposite rear surface or rear side 12B (see FIG. 4). The dial 12 has a scale 14 formed therein or formed on the front side 12A of the dial 12. The scale 14 may include tick marks 16 and may also include characters from an alphabet, for example, the character "E" identified by reference numeral 18A and the character "F" identified by reference numeral 18B and/or numeric characters. Additional characters may also be provided on the dial 12, for example, "FUEL" identified by reference numeral 20.

Figure 3:
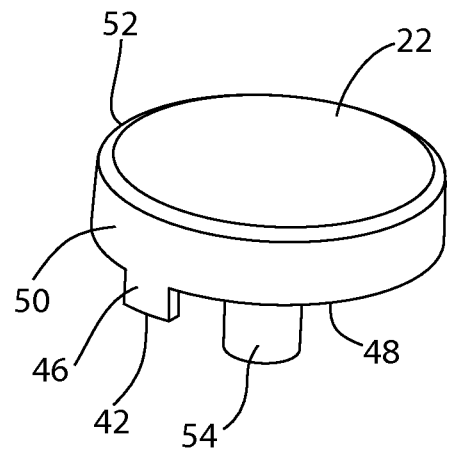
FIG. 3 is a perspective view of an opaque pointer cap is used in the first embodiment of the gauge.

Referring now to FIG. 3, there is shown a perspective view of an opaque pointer cap 22 that is used in a first embodiment of the gauge 10. At least all portions of the opaque pointer cap 22 that can be seen are preferably constructed to be opaque. The opaque pointer cap 22 is constructed with an opaque body portion 52 and an opaque side 50 that has a lower edge 48. The opaque pointer cap 22 also has a tubular connector or sleeve 54 for connecting the opaque pointer cap 22 to the shaft 34 of the motor 36. The opaque pointer cap 22 is constructed without an arm serving as a pointer. Rather, the opaque pointer cap 22 is constructed with a light blocking element 46 that blocks out a portion of the backlighting that emanates from the area of the dial 12 located behind the pointer cap 22. This will be explained in greater detail below. In the first embodiment of the gauge 10, the light blocking element 46 is preferably constructed as an opaque tab or as an opaque projection 42 extending from the lower edge 48 of the side 50 of the opaque pointer cap 22.

Figure 2:
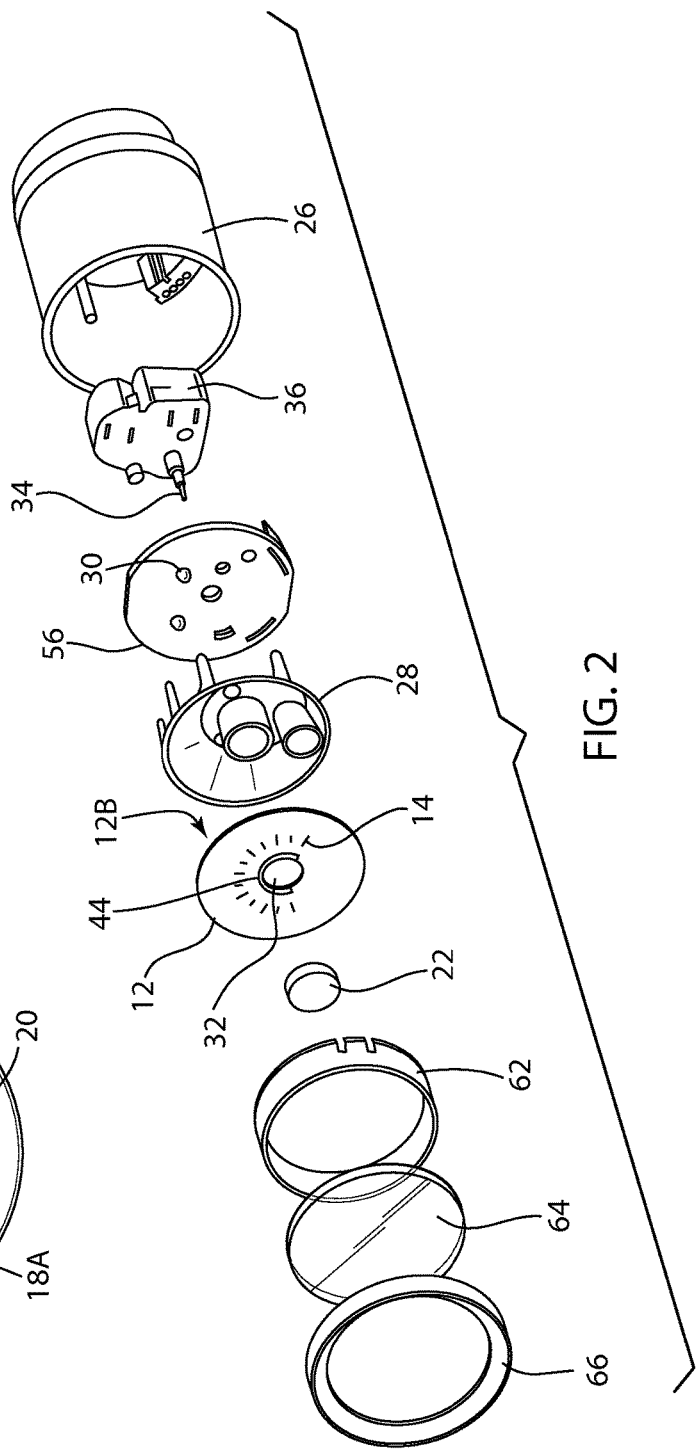
FIG. 2 is an exploded view of the first embodiment of the gauge.

Referring now to FIG. 2, there is shown an exploded view of the first embodiment of the mechanical gauge 10. The first embodiment of the gauge 10 preferably includes a reflector 28 and one or more light sources 30 for providing backlighting to the dial 12. The light sources 30 can be, for example, light emitting diodes. The reflector 28 is located behind the rear side 12B of the dial 12 and reflects the light from the one or more light sources 30 toward the rear side 12B of the dial 12 for backlighting the scale 14 and possibly other characters 18A, 18B, 20 that may be formed on or in the dial 12 (See FIG. 1). The one or more light sources 30 may be disposed on a printed circuit board 56 that positions the one or more light sources 30 in holes formed in the reflector 28 and in front of the reflector 28 to direct the light from the one or more light sources 30 toward the dial 12 to backlight the dial 12. The first embodiment of the gauge 10 includes a motor 36 that can rotate and hold its shaft 34 at a particular position in response to a received control signal. The motor 36 is preferably a stepper motor. The components of the first embodiment of the gauge 10 are preferably secured in a housing 26. For example, at least the motor 36, printed circuit board 56, reflector 28, and dial 12 are preferably secured in the housing 26. The first embodiment of the gauge 10 may include a lens 64, an annular spacer 62 spacing the lens 64 in front of and away from the dial 12, and a securing cap 66 securing the lens 64 and the annular spacer 62 to the housing 26. The first embodiment of the gauge 10 also includes the opaque pointer cap 22 shown in FIG. 3.

FIG. 2 shows that the dial 12 has an aperture 32 formed therein. The aperture 32 is preferably a central aperture that is centrally located with respect to the scale 14 of the dial 12. However, the aperture 32 need not necessarily be centrally located with respect to the scale 12. The opaque pointer cap 22 is placed in front of the front side 12A of the dial 12 such that the sleeve 54 of the opaque pointer cap 22 extends through the aperture 32 of the dial 12. The sleeve 54 is then connected to the shaft 34 of the motor 36 so that the motor 36 can move or rotate the light blocking element 46 of the opaque pointer cap 22 to a desired or particular position that is dictated by the control signal supplied to the motor 36 (also see FIG. 4). It is inevitable that backlighting supplied by the one or more light sources 30 and reflected by the reflector 28 behind the dial 12 will escape or leak through the space between the shaft 34 of the motor 36 and the outer edges which define the aperture 32 of the dial 12.

FIG. 1 shows that the opaque body portion 52 of the opaque pointer cap 22 completely covers the aperture 32 so that the leaking backlighting, i.e. the backlighting from the one or more light sources 30 that passes through the aperture 32 cannot be directly seen. However, the backlighting does emanate from underneath the opaque pointer cap 22 and in doing so creates a halo of light around at least a portion of the opaque pointer cap 22. The leaking backlighting can be seen extending around at least a portion of the opaque pointer cap 22 in a region between the opaque pointer cap 22 and the scale 14 of the dial 12. However, the light blocking element 46 will prevent the leaking backlighting from emanating from underneath the opaque pointer cap 22 at the location of the light blocking element 46. Since the leaking backlighting can be seen emanating from underneath the opaque pointer cap 22 except at the location of the light blocking element 46, a pointer 24 is optically created at the location of the light blocking element 46.

It is desirable to increase the amount of backlighting that leaks from the area in or near the aperture 32 so that the optically created pointer 24 can be seen even more clearly. Two examples of increasing the leaking backlighting will be discussed. However, the invention should not be construed as being limited to the structure of the two examples.

A first way of facilitating an increased amount of leaking backlighting is to increase the size of the aperture 32. The aperture 32 could be enlarged in only the region adjacent the scale 14 of the dial to allow a greater amount of backlighting to leak through the aperture 32 and emanate from behind the opaque pointer cap 22 in the region between the scale 14 and the opaque pointer cap 22. The aperture 32 does not need to be enlarged in a region thereof that is not located adjacent the scale 14 since there is no need to optically create a pointer at that location. The body portion 52 of the opaque pointer cap 22 should completely cover the entire area of the aperture 32 including the enlarged portion.

A second way of facilitating an increased amount of leaking backlighting is to form the dial 12 with a transparent portion 44 located adjacent the aperture 32 as can be seen in FIG. 2. The transparent portion 44 preferably extends radially outward from the aperture 32 and toward the scale 14 in the region between the scale 14 and the aperture 32. The transparent portion 44 need not be formed in a region that is not located between the scale 14 and aperture 32 since there is no need to optically create a pointer at that location. The body portion 52 of the opaque pointer cap 22 completely covers the transparent portion 44 of the dial 12. The transparent portion 44 is preferably constructed from a material that allows light to pass therethrough.

Figure 4:
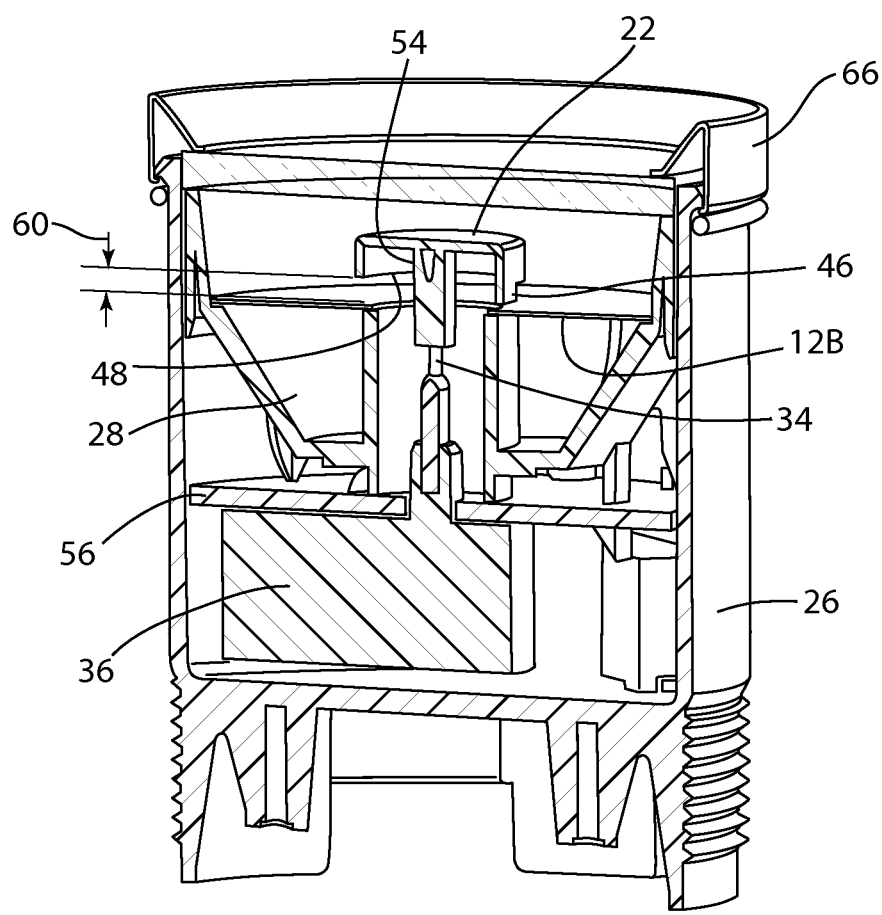
FIG. 4 is a sectional view of the first embodiment of the gauge.

FIG. 4 is a sectional view of the first embodiment of the gauge 10. The connection between the sleeve 54 of the opaque pointer cap 22 and the shaft 34 of the motor 36 can be seen. The gap 60 between the lower edge 48 of the opaque pointer cap 22 and the front side 12A of the dial 12 can also be seen.

Figure 5:
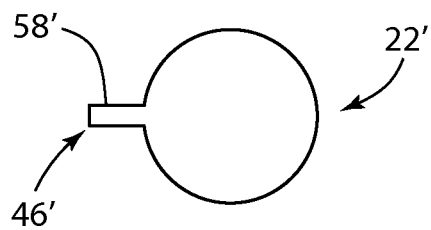
FIG. 5 is a front view of a further opaque pointer cap that is used in a second embodiment of the gauge.

FIG. 5 is a front view of a further opaque pointer cap 22' that is used in a second embodiment of the mechanical gauge 10'. The light blocking element 46' of the further opaque pointer cap 22' is constructed differently compared to the light blocking element 46 of the opaque pointer cap 22 that is used in the first exemplary embodiment of the gauge 10. Other than that change, all other features of the further opaque pointer cap 22' can be identical to the corresponding features of the opaque pointer cap 22. The specific difference is that the light blocking element 46' of the further opaque pointer cap 22' is constructed as an opaque pointer 58' radially extending from the side and/or front surface of the opaque pointer cap 22.

Figure 6:
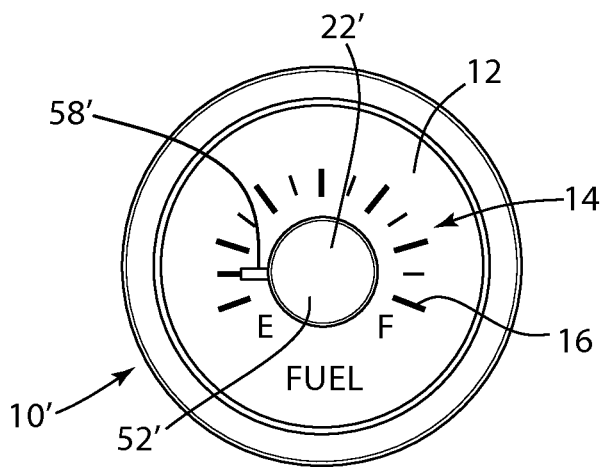
FIG. 6 is a front view of the second exemplary embodiment of the gauge.
Figure 7:
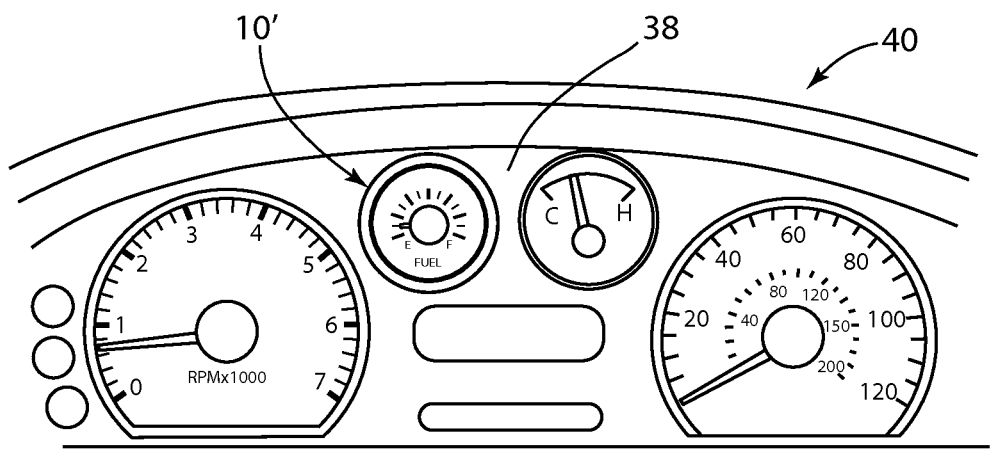
FIG. 7 is a front view of an automobile instrument panel.

FIG. 6 is a front view of a second exemplary embodiment of the mechanical gauge 10'. The second exemplary embodiment of the gauge 10' is preferably constructed identically to the first exemplary embodiment of the gauge 10 except for the differently constructed further opaque pointer cap 22' discussed above. FIG. 7 is a front view of an automobile instrument panel 40 showing the second exemplary embodiment of the gauge 10' and another gauge, such as a speedometer 70 located in the front panel 38 of the automobile instrument panel 40.

FIG. 6 shows that the opaque pointer 58' of the opaque pointer cap 22' extends towards the scale 14. The opaque pointer 58' is preferably colored black and preferably does not extend over the tick marks 16 of the scale 14. The backlighting from the one or more light sources 30 that leaks through the aperture 32 (see FIG. 2) of the dial 12 and that emanates from behind the body portion 52' of the opaque pointer cap 22 can be seen between the body portion 52 of the opaque pointer cap 22' and the scale 14. However, the light blocking element 46' in the form of the opaque pointer 58' blocks out the leaking backlighting that is located behind it. Since, the leaking backlighting can be seen between the scale 14 and the opaque pointer cap 22' at locations other than behind the opaque pointer 58', the leaking backlighting greatly enhances the visibility of the opaque pointer 58'.

Due to the low range of light luminescence, it is preferable to construct the gauge 10 as a small gauge, for example, as a fuel gauge, a temperature gauge, an oil pressure gauge, a battery charge gauge, etc. However, the invention should not be construed as being limited to a smaller gauge.

Now that the important features of the invention have been explained, it should be apparent to the person of ordinary skill in the art that numerous variants are possible. Thus, it should be understood that the invention is not limited to the specific examples discussed herein.

I claim:

1. A gauge, comprising:
   a dial with a front side having a scale, a rear side and an aperture extending through the dial;
   a motor located behind said rear side of said dial, said motor having a rotatable shaft;
   a light source behind the rear side of the dial, the light source configured to provide light behind said rear side of said dial, such that at least some of the light passes through the aperture and at least some of said light passing through the aperture radiates circularly from the aperture and across the front side of the dial;
   a rotatable, opaque pointer cap comprising:
      an opaque body located in front of and spatially separated from the front side of the dial, the spatial separation between the opaque body and front side of the dial being sized to allow at least some light from the light source to emanate through the spatial separation and spread radially across the front side of the dial, the opaque body portion being sized and shaped to cover the aperture, the opaque body portion having a front that faces away from the dial and a back that faces toward the dial and a peripheral edge;
      a connector extending from the back of the opaque body portion and located inside the peripheral edge of the opaque body, the connector extending through the aperture and being attached to the rotatable motor shaft; and
      an opaque tab extending away from a lower edge of a side of the opaque pointer cap, the opaque tab being sized and shaped to block a sector of light emanating radially through the spatial separation and across the front side of the dial, the sector of blocked light creating a darkened region of light missing from the front side of the dial, and which rotates with rotation of the pointer cap by the motor to provide an optically created rotating pointer of missing light.

* * * * *